(12) United States Patent
Augustine

(10) Patent No.: US 7,968,492 B2
(45) Date of Patent: Jun. 28, 2011

(54) LAYERED CATALYST TO IMPROVE SELECTIVITY OR ACTIVITY OF MANGANESE CONTAINING VANADIUM-FREE MOBILE CATALYST

(75) Inventor: Steven M. Augustine, Ellicott City, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 204 days.

(21) Appl. No.: 12/463,828

(22) Filed: May 11, 2009

(65) Prior Publication Data

US 2010/0284876 A1 Nov. 11, 2010

(51) Int. Cl.
- *B01J 23/00* (2006.01)
- *B01J 23/32* (2006.01)
- *B01J 23/70* (2006.01)
- *B01J 23/74* (2006.01)
- *B01J 8/00* (2006.01)
- *B01D 53/56* (2006.01)
- *B01D 53/86* (2006.01)
- *C01B 21/00* (2006.01)

(52) U.S. Cl. ........ 502/350; 502/304; 502/324; 502/338; 502/349; 502/352; 423/239.1

(58) Field of Classification Search ............ 502/304, 502/324, 338, 349, 350, 352; 423/239.1
See application file for complete search history.

(56) References Cited

U.S. PATENT DOCUMENTS

| | | | |
|---|---|---|---|
| 3,279,884 A | 10/1966 | Nonnenmacher et al. | |
| 4,048,112 A | 9/1977 | Matsushita et al. | |
| 4,085,193 A | 4/1978 | Nakajima et al. | |
| 4,221,768 A | 9/1980 | Inoue et al. | |
| 4,833,113 A | 5/1989 | Imanari et al. | |
| 4,855,115 A | 8/1989 | Imanari et al. | |
| 5,021,392 A | 6/1991 | Daly et al. | |
| 5,082,820 A * | 1/1992 | Mitsui et al. | 502/350 |
| 5,198,403 A | 3/1993 | Brand et al. | |
| 6,391,276 B1 | 5/2002 | Suda et al. | |
| 7,247,283 B2 | 7/2007 | Hedouin | |
| 7,419,718 B2 | 9/2008 | Ogata et al. | |
| 7,879,759 B2 * | 2/2011 | Augustine et al. | 502/350 |
| 2003/0186805 A1 * | 10/2003 | Vanderspurt et al. | 502/304 |
| 2006/0084569 A1 | 4/2006 | Augustine et al. | |
| 2010/0209324 A1 * | 8/2010 | Augustine | 423/239.1 |

FOREIGN PATENT DOCUMENTS

| | | |
|---|---|---|
| JP | 2003/093880 A | 4/2003 |
| JP | 2006/068663 A | 3/2006 |

OTHER PUBLICATIONS

Das, D. et al; "Iron, and manganese doped $SO_4^{2-}/ZrO_2$-$TiO_2$ mixed oxide catalysts: studies on acidity and benzene isopropylation activity" Catalysts Letters vol. 93, Nos. 3-4; Mar. 2004; pp. 185-193.
PCT/US2010/034236; International Search Report and Written Opinion; Jan. 26, 2011; 8 pages.

* cited by examiner

*Primary Examiner* — Stanley Silverman
*Assistant Examiner* — Anthony J Zimmer
(74) *Attorney, Agent, or Firm* — Dunlap Codding, P.C.

(57) ABSTRACT

Low temperature activity and high temperature ammonia selectivity of a vanadium-free selective catalytic reduction catalyst are controlled with a mixed oxide support containing oxides of titanium and zirconium, and a plurality of alternating layers respectively formed of a metal compound and titanium oxide present on the surface of the mixed oxide support. The metal compound is selected from the group consisting of manganese oxide, iron oxide, cerium oxide, tin oxide, and mixtures thereof.

21 Claims, No Drawings

LAYERED CATALYST TO IMPROVE SELECTIVITY OR ACTIVITY OF MANGANESE CONTAINING VANADIUM-FREE MOBILE CATALYST

CROSS REFERENCE TO RELATED APPLICATIONS

Not Applicable.

STATEMENT REGARDING FEDERALLY SPONSORED RESEARCH OR DEVELOPMENT

Not applicable.

BACKGROUND

1. Field of Invention

The invention relates generally to catalysts and methods of making catalysts and, more particularly, but not by way of limitation, to catalysts and methods of making catalysts that are useful for purifying exhaust gases and waste gases from combustion processes.

2. Background of the Invention

The high temperature combustion of fossil fuels or coal in the presence of oxygen leads to the production of unwanted nitrogen oxides ($NO_x$). Significant research and commercial efforts have sought to prevent the production of these well-known pollutants, or to remove these materials prior to their release into the air. Additionally, federal legislation has imposed increasingly more stringent requirements to reduce the amount of nitrogen oxides released to the atmosphere.

Processes for the removal of $NO_x$ formed in combustion exit gases are well known in the art. The selective catalytic reduction (SCR) process is particularly effective. In this process, nitrogen oxides are reduced by ammonia (or another reducing agent such as unburned hydrocarbons present in the waste gas effluent) in the presence of a catalyst with the formation of nitrogen. Effective SCR $DeNO_x$ catalysts include a variety of mixed metal oxide catalysts, including vanadium oxide supported on an anatase form of titanium dioxide (see, for example, U.S. Pat. No. 4,048,112) and titania and at least the oxide of molybdenum, tungsten, iron, vanadium, nickel, cobalt, copper, chromium or uranium (see, for example, U.S. Pat. No. 4,085,193).

A particularly effective catalyst for the selective catalytic reduction of $NO_x$ is a metal oxide catalyst comprising titanium dioxide, divanadium pentoxide, and tungsten trioxide and/or molybdenum trioxide (U.S. Pat. No. 3,279,884). Also, U.S. Pat. Appl. Pub. No. 2006/0084569 (projected U.S. Pat. No. 7,491,676) teaches a method of producing an improved catalyst made of titanium dioxide, vanadium oxide and a supported metal oxide, wherein the titania supported metal oxide has an isoelectric point of less than or equal to a pH of 3.75 prior to depositing the vanadium oxide.

Vanadium and tungsten oxides supported on titania have been standard catalyst compositions for $NO_x$ reduction since its discovery in the 1970's. In fact, very few alternatives rival the catalytic performance of vanadium and tungsten oxides supported on titania. Despite the performance advantages of vanadium and tungsten oxides supported on titania, it would be advantageous to replace tungsten and/or vanadium with alternative metal components due to the significant drawbacks with using both tungsten and vanadium in SCR catalysts. First, tungsten shortages have led to increased costs associated with its use. Second, the potential toxicity of vanadium oxide has led to health concerns regarding its use in selective catalytic reduction $DeNO_x$ catalysts for mobile applications, as well as significant costs associated with disposal of spent catalysts.

It is known in the art that iron-supported titanium dioxide is an effective selective catalytic reduction $DeNO_x$ catalyst (see, for example, U.S. Pat. No. 4,085,193). However, the limitations to using iron as an alternative are its lower relative activity and, by comparison, a high rate of oxidation of sulfur dioxide to sulfur trioxide (see, for example, Canadian Pat. No. 2,496,861). Another alternative being proposed is transition metals supported on beta zeolites (see for example, U.S. Pat. Appl. Pub. No. 2006/0029535). The limitation of this technology is the high cost of zeolite catalysts, which can be a factor of 10 greater than comparable titania supported catalysts.

For implementation of lean burn engine technologies, the SCR $DeNO_x$ catalyst used must have the capability of achieving very high reduction of $NO_x$ over a broad range of temperatures, for example at least the range of 250° C. to 450° C. Most catalysts for lean burn applications exhibit satisfactory performance over only a fairly narrow temperature range; therefore, suitable catalysts are the focus of considerable research. Manganese oxide-based catalysts have been suggested for use as low temperature SCR $DeNO_x$ catalysts, as have similar iron, cerium, copper, tin oxide-base catalysts. However, the manganese oxide-based catalysts are limited at higher temperatures due to low ammonia selectivity. Another disadvantage when using manganese is its high selectivity for $N_2O$ formation, which contributes to ozone formation and acts as a greenhouse gas.

There remains a need for catalysts that exhibit improved performance for selective catalytic reduction of $NO_x$ in the presence of ammonia over at least a temperature range of 250° C. to 450° C. To this end, it is desirable to improve the ammonia selectivity of manganese, iron, cerium and/or tin containing SCR $DeNO_x$ catalysts at temperatures of 450° C. and above, while providing improved conversion activity at temperatures of 250° C. and below, as well.

SUMMARY OF THE INVENTION

The present invention is directed to a catalyst composition having a mixed oxide support containing oxides of titanium and zirconium. A plurality of alternating layers respectively formed of a metal compound and titanium oxide are present on the surface of the mixed oxide support. The metal compound is an oxide of manganese, iron, cerium or tin. In one embodiment, a vanadium-free catalyst for selective oxidation of nitrogen oxide with ammonia is presented having a mixed oxide support containing oxides of titanium and zirconium wherein the molar ratio of titanium oxide to zirconium oxide in the mixed oxide support is in a range of from about 70:30 to about 85:15. A first layer containing an oxide of manganese, iron, cerium or tin is present on the mixed oxide support in an amount of from about 0.5 mol % to about 15 mol % of the mixed oxide support. A second layer containing titanium oxide is present on the manganese, iron, cerium or tin oxide-containing first layer of the mixed oxide support in an amount in a range of from about 0.5 mol % to about 10 mol % of the mixed oxide support.

In another embodiment, a method of making a catalyst for selective catalytic reduction of nitrogen oxide is provided. The method includes the steps of: (a) providing a mixed metal oxide support; (b) depositing a first layer containing manganese, iron, cerium or tin onto the surface of the mixed oxide support; and (c) depositing a second layer containing titanium over the first layer containing manganese, iron, cerium or tin.

A method of controlling the activity or selectivity of a catalyst used for selective catalytic reduction of nitrogen oxides with ammonia is achieved by providing a mixed metal oxide support comprising titanium oxide and zirconium oxide, and depositing a plurality of layers respectively formed of a metal compound and titanium oxide onto the surface of the mixed metal oxide. Suitable metal compounds include oxides of manganese, iron, cerium and tin. The number of layers and the quantities of the metal compound and titanium oxide deposited are controlled to provide desired levels of low temperature activity or high temperature selectivity.

In yet another embodiment, a method is provided for selective reduction of nitrogen oxides with ammonia, wherein the nitrogen oxides are present in a gas stream. The method includes contacting the gas stream with ammonia in the presence of the above-described catalyst.

Thus, utilizing (1) the technology known in the art; (2) the above-referenced general description of the presently claimed and/or disclosed inventive process(es), methodology (ies), apparatus(es) and composition(s); and (3) the detailed description of the invention that follows, the advantages and novelties of the presently claimed and/or disclosed inventive process(es), methodology(ies), apparatus(es) and composition(s) would be readily apparent to one of ordinary skill in the art.

DETAILED DESCRIPTION OF THE INVENTION

Before explaining at least one embodiment of the invention in detail, it is to be understood that the invention is not limited in its application to the details of construction, experiments, exemplary data, and/or the arrangement of the components set forth in the following description. The invention is capable of other embodiments or of being practiced or carried out in various ways. Also, it is to be understood that the terminology employed herein is for purpose of description and should not be regarded as limiting.

There is a need for new technologies having the capability of achieving very high reduction of $NO_x$ from lean burn engines at low operating temperatures around 250° C. as well as high temperatures around 450° C. Certain metals such as manganese, iron, cerium and tin can be a critical component for good low temperature $DeNO_x$ conversion utilizing a vanadium-free catalyst. However, catalysts utilizing manganese, for example, have been limited at higher temperature due to low ammonia selectivity. Previously known manganese-containing catalysts also suffer the drawback that they exhibit high selectivity for $N_2O$ formation, which contributes to ozone formation and acts as a greenhouse gas. Surprisingly, it has been discovered that sequential layering of components on a vanadium-free mixed titanium and zirconium metal oxide support can be used to improve either high temperature selectivity or low temperature activity.

Layering substrates is a common technique used in synthesizing other types of catalysts, such as three-way conversion catalysts, and for purposes quite different from the present discovery of improving high temperature selectivity or low temperature activity. For example, one can subsequently deposit different materials to accomplish different functions as in European Patent Application 1 053 778 A1, which discloses the use of a bottom layer of a chemically inert substrate to impart structure. Upon the bottom layer is deposited a mixed metal oxide for high surface area and thermal stability. The catalytically active material is then deposited as the final layer.

Also, U.S. Pat. No. 5,863,855 discloses a layered catalyst in which the top layer, that which is exposed most directly to the impinging fluid phase, is formulated from a material with a low abrasion resistance. The layer underneath contains the catalytically active phase. The purpose of the top layer is to capture calcium and arsenic compounds prior to their poisoning the active phase using attrition to remove these compounds from the catalyst during normal operation before they can cause any harm to catalyst activity.

Two layers of a catalyst can also be used to prevent desorption of unwanted compounds as described in U.S. Pat. No. 5,057,483. In this case, hydrogen sulfide, which is an unwanted by-product of conventional three-way emission catalysis that may be formed on Pt residing in the bottom layer, is destroyed by iron or nickel oxides at the top layer.

Another reason for layering a catalyst is to make use of two specifically different morphologies to accomplish two different tasks. U.S. Pat. No. 5,597,771 describes a bottom layer where the platinum group metal is in intimate contact with an oxygen storage component such as cerium oxide to promote oxidation-reduction reactions. However, it is taught that in the top layer the platinum group is specifically prevented from intimate contact with the oxygen storage component allowing it to catalyze the reduction of nitrogen oxides to nitrogen and the oxidation of hydrocarbons.

A more sophisticated approach has been asserted by T. Morita, N. Suzuki, N. Satoh, K. Wada, and H. Ohno in SAE publication 2007-01-0239. In this work, the authors propose a top zeolite layer with Bronsted acidity. Under this layer is a platinum group metal supported on an oxygen storage component. The purpose of the top, or zeolite layer, as stated by the authors, is to store ammonia produced during rich or reducing engine cycles. During the switch to lean cycles, the ammonia serves to convert the NOx released by the storage component. The purpose of the bottom layer is to trap NOx during lean engine cycles and then release this while also converting excess NOx to ammonia during a rich cycle.

Another primary reason for layering catalysts is to prevent the interaction of different platinum group metals where such interaction can compromise their efficiency. For example, U.S. Pat. No. 5,989,507 discloses a method where one precious metal is placed on a support particle of specific size while a second precious metal is placed on a support of significantly smaller size. During synthesis, the smaller particle diffuses closer to the substrate while the larger particle size stays closer to the fluid phase, thus producing a concentration gradient where the two precious metals are intentionally segregated. This can also be done by simply layering a top layer containing rhodium on a bottom layer containing platinum as disclosed in U.S. Pat. No. 4,806,519.

Thus, while catalyst layering has been used or proposed for other catalyst systems, layering has not previously been considered for vanadium-free mixed metal oxide catalysts or for manganese, iron, cerium or tin-containing mixed metal oxide catalysts. Nor would it be considered likely that layering could be used for the purpose of improving selectivity or increasing activity in an SCR $NO_x$ removal reaction.

However, it has been discovered that improved high temperature ammonia selectivity and reduced $N_2O$ formation, or improved low temperature activity, can be achieved by providing a plurality of alternating layers respectively formed of a metal compound and titanium oxide on the surface of a mixed metal oxide support, wherein the metal compound is an oxide of manganese, iron, cerium, tin, or mixtures thereof, and wherein the mixed metal oxide support contains both titanium and zirconium oxides. Preferably, the titanium and zirconium mixed metal oxide support is essentially free from vanadium. When referring to the mixed metal oxide support composition, the phrase "essentially free from vanadium" is used herein and in the appended claims to mean less than 0.1% vanadium or that the mixed metal oxide support contains no vanadium or only low levels of vanadium that do not significantly contribute to the catalytic activity of the catalysts.

The phrase "high temperature selectivity" refers herein and in the appended claims to "ammonia selectivity of a SCR DeNO$_x$ catalyst at temperatures in the range of from about 400° C. to about 500° C.," the high temperature range for mobile SCR DeNO$_x$ applications. The phrase "low temperature activity" refers herein and in the appended claims to "NO conversion efficiency of an SCR DeNO$_x$ catalyst at temperatures in the range of from about 200° C. to about 300° C.," the low temperature range for mobile SCR DeNO$_x$ applications.

Preferably, the mixed oxide support consists primarily of titanium and zirconium oxides and optionally manganese oxide. The molar ratio of titanium oxide to zirconium oxide can be any range known to those skilled in the art including, but not limited to, a range of from about 60:40 to about 90:10. In one embodiment, the molar ratio of titanium oxide to zirconium oxide is in a range of from about 70:30 to about 85:15.

In some embodiments, the mixed oxide support has a crystalline inner core surrounded by amorphous metal oxide. The crystalline inner core can vary between anatase, rutile and a mixed oxide phase that is 2:1 Ti:Zr called srilankite.

The first layer of manganese oxide is present on the mixed oxide support in an amount sufficient to achieve improved low temperature activity. Suitable amounts of manganese oxide include, but are not limited to, an amount in the range of from about 0.5 mol % to about 15 mol % of the mixed oxide support, or an amount in the range of from about 1 mol % to about 10 mol % of the mixed oxide support. The term "mol % of the mixed oxide support" (sometimes referred to herein as % equivalent) is defined as the number of mols divided by the mols of metal oxide in the mixed metal oxide support. So, for example, if 5 mols of manganese are deposited onto a mixed metal oxide support consisting of 80 mols of TiO$_2$ and 20 mols of ZrO$_2$, the manganese oxide is present in an amount of 5/(80+20) or 5 mol %.

The second layer comprises titanium oxide, the titanium oxide being present on the manganese oxide first layer in an amount sufficient to achieve improved high temperature NH$_3$ selectivity. Such amounts include, but are not limited to, an amount in the range of from about 0.5 mol % to about 10 mol % of the mixed oxide support, and an amount in a range of from about 0.5 mol % to about 5 mol % of the mixed oxide support. The mol % titanium oxide is calculated as above for manganese oxide.

The second layer of titanium oxide can cause a reduction in the low temperature activity increase provided by the first layer of manganese. In this case, a third layer comprising manganese oxide can be deposited on the second layer of titanium oxide in amounts sufficient to improve the low temperature activity. Such amounts include, but are not limited to, a range of from about 0.5 mol % to about 10 mol % of the mixed oxide support, or a range of from about 0.5 mol % to about mol % of the mixed oxide support. Additional sequential alternating layers of titanium and manganese oxide can be present in amounts necessary to achieve the desired activity and selectivity of the final catalyst.

A method of making the above described catalyst for selective catalytic reduction of nitrogen oxides is also provided. The method includes the steps of: (a) providing a mixed metal oxide support; (b) depositing a first layer containing manganese onto the surface of the mixed oxide support; and (c) depositing a second layer containing titanium over the first layer containing manganese.

The term "deposit" and its related forms are used herein and in the appended claims to include adsorption, ion exchange, precipitation and deposition processes and mechanisms generally resulting in formation of a layer or coating.

In one embodiment, the mixed metal oxide support is provided by precipitating titanium and zirconium from an aqueous solution. Precipitation of the mixed metal oxide support is achieved by mixing soluble titanium and zirconium compounds in water, or by mixing solutions of dissolved titanium and dissolved zirconium, in any order. Preferably, soluble salts of titanium or zirconium are used. Nonlimiting examples of titanium salts include titanium sulfate, titanium chloride, titanium oxychloride, and titanium nitrate. Similarly, nonlimiting examples of zirconium salts include zirconium sulfate, zirconium chloride and zirconium nitrate. Titanium and zirconium are precipitated from solution by adjusting the pH to, for example, a pH between about 5 to 10, to precipitate a mixture of titanium and zirconium oxides, hydroxides and hydrated oxides, hereinafter referred to as a mixed metal oxide precipitate. The composition of the mixed metal oxide precipitate can be controlled by controlling the ratio of titanium to zirconium salts added. For example, the molar ratio of titanium to zirconium salts added to the aqueous solution can be within a range of from about 60:40 to about 90:10. Complete precipitation results in a corresponding molar ratio of TiO$_2$:ZrO$_2$ in the mixed metal oxide within the range of from about 60:40 to about 90:10. In one embodiment, the molar ratio of TiO$_2$:ZrO$_2$ in the mixed metal oxide is within the range of from about 70:30 to about 85:15.

In another embodiment, precipitation of the mixed metal oxide support occurs as described above, but includes addition of a water soluble manganese compound, or an aqueous solution of dissolved manganese, to the combination of dissolved titanium and zirconium. Nonlimiting examples of soluble manganese salts include manganese sulfate, manganese chloride and manganese nitrate. The titanium, zirconium and manganese are precipitated from solution by adjusting the pH as described above. When used, the molar ratio of MnO$_2$:(TiO$_2$+ZrO$_2$) is typically in a range of from about 1:10 to 1:100.

During precipitation of the mixed metal oxide, the solution or slurry is stirred using means well known to persons of ordinary skill in the art. Unless otherwise specified or indicated by context, the terms "slurry" and "solution" are used interchangeably and include solutions, suspensions and slurries, as well as any other combination of substances as liquid or colloidal media.

The mixed metal oxide precipitate is separated from the aqueous solution using any conventional technique for solid-liquid separation, such as filtration, decanting, draining or centrifuging, and the separated precipitate is washed with, for example, deionized water to remove soluble ions from the precipitate. The precipitate is then dried to remove water. For the drying of this material, any temperature that is effective for removing moisture may be used. Methods and equipment for drying solids are well known to persons of ordinary skill in the art. In the laboratory, for example, the filter cake is dried in a laboratory drying oven for about 16 hours at about 100° C.

The catalysts are prepared by sequentially layering components. A first manganese containing layer is deposited onto the surface of the dried mixed metal oxide support by slurrying the dried mixed metal oxide precipitate in water and adding a soluble manganese compound. Any soluble manganese compound can be used. Examples of suitable manganese salts include, but are not limited to, manganese sulfate, manganese acetate, manganese chloride, and the like. A base or pH buffer such as ammonium bicarbonate is added to the slurry to insure full deposition of the manganese.

Preferably, one mixes the mixed metal oxide and soluble manganese compound in order to allow for as thorough a distribution of the manganese on the mixed metal oxide support surface as possible. Methods for mixing are well known to persons skilled in the art.

The amount of manganese deposited onto the mixed metal oxide support surfaces can vary. Typically, the manganese compound is added in quantities sufficient to achieve, when deposited on the support surface, improved low temperature activity. Suitable amounts of manganese for a single deposited coating include, but are not limited to, an amount in the range of from about 0.5 mol % to about 15 mol % of the mixed oxide support. The slurry is mixed for a time sufficient to allow deposition of the manganese onto the support. Such time can vary depending on operating conditions such as temperature, slurry concentration, etc., but often full deposition is achieved in 30 to 60 minutes or less.

A titanium-containing layer is deposited over the manganese-containing layer by slurrying the manganese coated mixed metal oxide with an aqueous solution containing dissolved titanium. As with the manganese coating, one mixes the manganese-coated mixed metal oxide and soluble titanium compound(s) in order to allow for as thorough a distribution of the titanium as possible. Any soluble titanium compound can be used. Examples of suitable titanium salts include, but are not limited to, titanyl sulfate, titanyl chloride, titanium tetrachloride, titanium oxylate, titanium tetraiodide, and the like. Again, a base or pH buffer such as ammonium bicarbonate can be added to the slurry to insure full deposition of the titanium.

The amount of titanium deposited onto the manganese-coated mixed metal oxide support can vary. Typically the titanium compound is added in a quantity sufficient to achieve improved high temperature ammonia selectivity, such as an amount in the range of from about 0.5 mol % to about 10 mol % of the mixed oxide support, as described above. The slurry is mixed for a time sufficient to allow deposition of the titanium onto the manganese-containing layer on the support. As with deposition of the manganese-containing layer, such time can vary depending on operating conditions such as temperature, slurry concentration, etc., but often full deposition is achieved in 30 to 60 minutes or less.

In other embodiments, additional sequentially added layers of manganese alternating with titanium are provided using the procedures described above. For example, and as described in more detail in Examples 1 and 2, depositing a third layer containing manganese can still further improve the low temperature activity.

Following mixing, the slurry is filtered and dried. As discussed above, methods for filtering and drying are well known to persons of ordinary skill in the art. For the drying of this material, any temperature that is effective for removing moisture may be used. Preferably, greater than 95% or greater than 98% of the free moisture is removed. For example, the temperature may be 100° C. or greater. After drying, the coatings on the mixed metal oxide support comprise alternating layers respectively formed of manganese oxide and titanium oxide.

The above described procedures allow one to control the activity or selectivity of the catalyst by providing a mixed metal oxide support comprising titanium oxide and zirconium oxide, and depositing a plurality of layers respectively formed of manganese and titanium onto the surface of the mixed metal oxide support. The number of layers and the quantities of manganese and titanium deposited are controlled to provide desired levels of low temperature activity or high temperature selectivity.

The resulting catalyst, as described above or as obtained from the process described above, is in the form of a powder, but it can also be shaped into granules, beads, cylinders or honeycombs of various dimensions. The catalyst can be applied to other supports that are routinely used in the catalysis field, such as alumina or silica. The catalyst can also be used in catalytic systems comprising a wash coat based on the catalyst and applied to a substrate that is, for example, a metallic or ceramic monolith.

The resulting catalyst composition may have many applications; however, these catalysts offer significant advantages for SCR DeNO$_x$ applications, and are particularly suitable for the treatment of exhaust gas from automobile internal combustion engines (sometimes referred to as mobile applications). To this end, the invention also concerns the use of a catalytic composition, as described above or as obtained by the processes described above, for selective reduction of nitrogen oxides with ammonia, wherein the nitrogen oxides are present in a gas stream such as an automobile post combustion exhaust gas.

In order to further illustrate the present invention, the following examples are given. However, it is to be understood that the examples are for illustrative purposes only and are not to be construed as limiting the scope of the invention.

Example 1

Preparation of the mixed oxide support involves precipitation of a Ti—Zr oxide. The precipitation was done by mixing titanium and zirconium salts dissolved in water with concentrated ammonium hydroxide at a controlled pH. The salts tested in this example were titanium sulfate and chloride; and zirconium nitrate and sulfate. The pH was varied from 7 to 9 and the TiO$_2$:ZrO$_2$ molar ratios were varied from 70:30 to 85:15. Transmission electron micrographs suggest that the resulting particles are comprised of a crystalline inner core surrounded by amorphous metal oxide. X-ray diffraction (XRD) results show that the crystalline core can vary between anatase, rutile and a mixed oxide phase that is 2:1 Ti:Zr called srilankite. The amorphous outer layer appears to be enriched in Zr. The resulting material was filtered and washed to remove spectator ions, as determined by conductivity measurements of the wash filtrate at or below 1 mS/cm. The filter cake was dried for at least 16 hrs at 100° C.

Example 2

After drying the filter cake from Example 1, the solids were slurried in water along with a soluble manganese salt, either manganese sulfate or manganese acetate. Ammonium bicarbonate was added to the slurry to ensure full deposition of Mn. The slurry was mixed for 30 min to 1 hr to allow adsorption of manganese on the support. In a second test, a 1% equivalent amount of Ti was added as titanyl sulfate after Mn deposition. A third test included the deposition of another 2% equivalent amount of Mn after the Ti deposition to further increase low temperature activity.

The resulting catalyst was tested in the powder form without further shaping. A ⅜" quartz reactor was used holding 0.1 g catalyst supported on glass wool. The gas feed composition was 1,000 ppm NO, 1,000 ppm NH$_3$, 5% O$_2$, 3% H$_2$O, and the balance was N$_2$. NO conversion was measured at 250° C. and 350° C. at atmospheric pressure. The reactor effluent was analyzed with an infrared detector to determine NO conversion and $NH_3$ selectivity. $N_2O$ selectivity was determined with a feed composition of 1,000 ppm NO, 1,200 ppm $NH_3$, 3% $O_2$, 2.3% $H_2O$, and the balance was $N_2$. The effluent was analyzed using a quadrupole mass spectrometer.

The results are shown in the following two tables.

TABLE 1

Comparison of catalyst selectivity and conversion

| Catalyst | Sample | $N_2O$ Selectivity at 350 C. (%) | NO Conversion at 450° C. (%) | $NH_3$ Selectivity at 450° C. (%) |
|---|---|---|---|---|
| 6221-175-6 | 6.0% Mn(II) SO4 80:20 Ti:Zr + NH4HCO3 at pH 8.0 | 3.9 | 65.2 | 79.0 |
| 6221-176-6 | 6.0% Mn(II) SO4 80:20 Ti:Zr + NH4HCO3 at pH 8.0 +1% TiO2 | 2.1 | 71.5 | 100.0 |
| 6221-182-6 | 2.0% Mn(II) SO4 on 6221-176-6 + NH4HCO3 at pH 8.0, calcined 600 C. | 9.8 | 42.9 | 46.3 |

TABLE 2

Comparison of catalyst low temperature activity

| | | Rxn Temp | | | |
|---|---|---|---|---|---|
| | | 250° C. | | 350° C. | |
| Catalyst | Sample | NO Conversion | $NH_3$ Selectivity | NO Conversion | $NH_3$ Selectivity |
| 6221-175-6 | 6.0% Mn(II) SO4 80:20 Ti:Zr + NH4HCO3 at pH 8.0 | 22.7 | 100.0 | 68.6 | 100.0 |
| 6221-176-6 | 6.0% Mn(II) SO4 80:20 Ti:Zr + NH4HCO3 at pH 8.0 + 1% TiO2 | 18.2 | 100.0 | 59.2 | 100.0 |
| 6221-182-6 | 2.0% Mn(II) [sulfate] on 6221-176-6 + NH4HCO3 at pH 8.0, calcined 600° C. | 37.7 | 100.0 | 66.5 | 100.0 |

The original case (catalyst 6221-175-6) exhibited good conversion at 450° C., but an ammonia selectivity less than 100% and a $N_2O$ selectivity of 3.9%. Layering the equivalent 1% titania over the Mn active phase improved ammonia selectivity to 100% at 450° C. and reduced $N_2O$ selectivity to 2.1% (catalyst 6221-176-6). Conversion at low temperatures is reduced as shown in Table 2; however, conversion can be increased by depositing another layer of Mn onto the catalyst as demonstrated in Case 3 (catalyst 6221-182-6). These examples show that layering the various components on the catalyst allows one to control activity and selectivity on the final catalyst.

From the above examples and descriptions, it is clear that the present inventive process(es), methodology(ies), apparatus(es) and composition(s) are well adapted to carry out the objects and to attain the advantages mentioned herein, as well as those inherent in the presently provided disclosure. While presently preferred embodiments of the invention have been described for purposes of this disclosure, it will be understood that numerous changes may be made which will readily suggest themselves to those skilled in the art and which are accomplished within the spirit of the presently claimed and disclosed inventive process(es), methodology(ies), apparatus(es) and composition(s) described herein.

What is claimed is:

1. A catalyst composition comprising: (a) a mixed metal oxide support consisting essentially of oxides of titanium, zirconium, and optionally manganese, and (b) alternating layers respectively formed of a metal compound and titanium oxide on the surface of the mixed metal oxide support, wherein the metal compound is selected from the group consisting of manganese oxide, iron oxide, cerium oxide, tin oxide, and mixtures thereof.

2. The catalyst of claim 1, wherein the mixed metal oxide support is essentially free from vanadium.

3. The catalyst of claim 2, wherein the molar ratio of titanium oxide to zirconium oxide in the mixed metal oxide support is in the range of from about 60:40 to about 90:10.

4. The catalyst of claim 2, wherein the mixed metal oxide support further comprises a crystalline inner core surrounded by amorphous metal oxide.

5. The catalyst of claim 4, wherein the crystalline inner core comprises an oxide selected from the group consisting of anatase, rutile, srilankite, and mixtures thereof.

6. The catalyst of claim 2, wherein a first layer of manganese oxide is present on the mixed metal oxide support in an amount in a range of from about 0.5 mol % to about 15 mol % of the mixed metal oxide support.

7. The catalyst of claim 6, wherein a first layer of manganese oxide is present on the mixed metal oxide support in an amount in a range of from about 1 mol % to about 10 mol % of the mixed metal oxide support.

8. The catalyst of claim 6, wherein a second layer of titanium oxide is present on the manganese oxide first layer of the mixed metal oxide support in an amount in a range of from about 0.5 mol % to about 10 mol % of the mixed metal oxide support.

9. The catalyst of claim 8, wherein a second layer of titanium oxide is present on the manganese oxide first layer of the mixed metal oxide support in an amount in a range of from about 0.5 mol % to about 5 mol % of the mixed metal oxide support.

10. The catalyst of claim 8, wherein a third layer of manganese oxide is present on the titanium oxide second layer of the mixed metal oxide support in an amount in a range of from about 0.5 mol % to about 10 mol % of the mixed metal oxide support.

11. The catalyst of claim 8, wherein a third layer of manganese oxide is present on the titanium oxide second layer of the mixed metal oxide support in an amount in a range of from about 0.5 mol % to about 5 mol % of the mixed metal oxide support.

12. A vanadium-free catalyst for selective catalytic reduction of nitrogen oxide with ammonia, the catalyst comprising: (a) a mixed metal oxide support consisting essentially of oxides of titanium and zirconium and optionally manganese, wherein the molar ratio of titanium oxide to zirconium oxide in the mixed metal oxide support is in a range of from about 70:30 to about 85:15; (b) a first layer containing a metal compound selected from the group consisting of manganese oxide, iron oxide, cerium oxide, tin oxide, and mixtures thereof, the metal compound being present on the mixed metal oxide support in an amount in a range of from about 0.5 mol % to about 15 mol % of the mixed metal oxide support; and (c) a second layer containing titanium oxide present on the metal compound first layer of the mixed metal oxide support in an amount in a range of from about 0.5 mol % to about 10 mol % of the mixed metal oxide support.

13. A method of making a catalyst for selective catalytic reduction of nitrogen oxide, the method comprising the following steps:
    providing a mixed metal oxide support consisting essentially of oxides of titanium, zirconium and optionally manganese;
    depositing a first layer, the first layer containing manganese, iron, cerium, tin, or mixtures thereof, onto the surface of the mixed metal oxide support; and
    depositing a second layer, the second layer containing titanium, over the first layer containing manganese, iron, cerium, tin, or mixtures thereof.

14. The method of claim 13, wherein the mixed metal oxide support is prepared by precipitating titanium, zirconium, and optionally manganese, from an aqueous solution.

15. The method of claim 13 wherein the mixed metal oxide support is provided by precipitating titanium and zirconium oxides from an aqueous solution containing dissolved titanium and zirconium, wherein the precipitation is encouraged by increasing the pH to a range of from about 5 to about 10, and wherein the resulting mixed metal oxide has a $TiO_2$:$ZrO_2$ molar ratio in a range of from about 70:30 to about 85:15.

16. The method of claim 13 wherein manganese is deposited as the first layer in an amount in a range of from about 0.5 mol % to about 15 mol % of the mixed oxide support.

17. The method of claim 13 wherein titanium is deposited as the second layer in an amount in a range of from about 0.5 mol % to about 10 mol % of the mixed oxide support.

18. The method of claim 13 wherein the step of depositing a second layer containing titanium over the first layer containing manganese comprises depositing titanium from an aqueous solution containing a dissolved compound selected from the group consisting of titanyl sulfate, titanyl chloride, titanium tetrachloride, titanium oxalate, titanium tetraiodide and mixtures thereof.

19. The method of claim 13 further comprising the step of:
    depositing a third layer, the third layer containing manganese, over the second layer containing titanium.

20. A method of controlling the activity or selectivity of a catalyst used for selective catalytic reduction of nitrogen oxides with ammonia, the method comprising:
    providing a mixed metal oxide support consisting essentially of oxides of titanium, zirconium and optionally manganese; and
    depositing alternating layers respectively formed of a metal compound and titanium onto the surface of the mixed metal oxide support, wherein the metal compound is selected from the group consisting of oxides of manganese, iron, cerium, tin and mixtures thereof, and wherein the number of layers and the quantities of the metal compound and the titanium deposited are selected to provide desired levels of low temperature activity or high temperature selectivity.

21. A method for selective reduction of nitrogen oxides with ammonia, wherein the nitrogen oxides are present in a gas stream, the method comprising:
    contacting the gas stream with ammonia in the presence of a catalyst, the catalyst comprising:
        a mixed oxide support consisting essentially of oxides of titanium, zirconium, and optionally manganese; and
        a plurality of layers respectively formed of a metal compound and titanium oxide deposited on the mixed oxide support, wherein the metal compound is selected from the group consisting of manganese oxide, iron oxide, cerium oxide, tin oxide, and mixtures thereof.

* * * * *

UNITED STATES PATENT AND TRADEMARK OFFICE
CERTIFICATE OF CORRECTION

| | | |
|---|---|---|
| PATENT NO. | : 7,968,492 B2 | Page 1 of 1 |
| APPLICATION NO. | : 12/463828 | |
| DATED | : June 28, 2011 | |
| INVENTOR(S) | : Steven M. Augustine | |

It is certified that error appears in the above-identified patent and that said Letters Patent is hereby corrected as shown below:

Column 10, line 19: After "support" delete "further".

Signed and Sealed this
Sixteenth Day of August, 2011

David J. Kappos
*Director of the United States Patent and Trademark Office*